(12) United States Patent
Wucherer et al.

(10) Patent No.: US 11,208,762 B2
(45) Date of Patent: Dec. 28, 2021

(54) METHOD FOR SEPARATING FIBERS

(71) Applicant: REPULPING TECHNOLOGY GMBH & CO. KG, Schiltberg (DE)

(72) Inventors: Stephan Wucherer, Geisenfled (DE); Christian Elsner, Herzebrock (DE)

(73) Assignee: REPULPING TECHNOLOGY GMBH & CO. KG, Schiltberg (DE)

(*) Notice: Subject to any disclaimer, the term of this patent is extended or adjusted under 35 U.S.C. 154(b) by 206 days.

(21) Appl. No.: 16/472,868

(22) PCT Filed: Dec. 15, 2017

(86) PCT No.: PCT/EP2017/083129
§ 371 (c)(1),
(2) Date: Jun. 22, 2019

(87) PCT Pub. No.: WO2018/114711
PCT Pub. Date: Jun. 28, 2018

(65) Prior Publication Data
US 2020/0190736 A1    Jun. 18, 2020

(30) Foreign Application Priority Data
Dec. 22, 2016    (DE) .................... 10 2016 125 446.0

(51) Int. Cl.
*D21B 1/26*    (2006.01)
*D21B 1/02*    (2006.01)
(Continued)

(52) U.S. Cl.
CPC ............ *D21B 1/026* (2013.01); *D21B 1/322* (2013.01); *B29B 2017/0251* (2013.01);
(Continued)

(58) Field of Classification Search
CPC ......... D21B 1/026; D21B 1/322; D21B 1/345
(Continued)

(56) References Cited

U.S. PATENT DOCUMENTS 4,992,308 A * 2/1991 Sunol ................ B05D 7/06
427/297
6,336,992 B1    1/2002 Blomquist
(Continued)

FOREIGN PATENT DOCUMENTS

DE    102011083667 A1    10/2012
WO    99/39043 A1    8/1999
WO    0163041 A1    8/2001

OTHER PUBLICATIONS

International Search Report PCT/EP2017/083129, dated Mar. 19, 2018, 4 Pages.
(Continued)

*Primary Examiner* — Jacob T Minskey
(74) *Attorney, Agent, or Firm* — Brooks Kushman P.C.

(57) ABSTRACT

A method for separating fibers using a container, a vacuum pump which is connected to the container volume via a vacuum valve, and a ventilation line with a cross-sectional opening and a valve. The valve can be switched between a closed and open state in a time domain of 19-41 ms and from the open state into the closed state in a time domain of 20 to 45 ms. The method has the steps of filling the container with water and fiber composite, closing the container, mixing the water and the fiber composite using mechanical energy, by stirring, generating kinetic energy in the fiber composite by lowering the container internal pressure to a value between −700 to −950 hPa, and equalizing the pressure in the container to generate cavitation in the fiber composite. The pressure equalization taking place within at least onetime domain of 0.001-1 s.

19 Claims, 7 Drawing Sheets

(51) Int. Cl.
  *D21B 1/32*   (2006.01)
  *B29B 17/02*  (2006.01)
  *B29L 31/00*  (2006.01)
  *D21B 1/34*   (2006.01)
  *D21C 5/02*   (2006.01)
(52) U.S. Cl.
  CPC ....... *B29L 2031/7166* (2013.01); *D21B 1/345* (2013.01); *D21C 5/02* (2013.01)
(58) Field of Classification Search
  USPC .......................................................... 162/4
  See application file for complete search history.

(56)         References Cited

U.S. PATENT DOCUMENTS

2002/0088570 A1*  7/2002  Sundaram .............. D21C 9/153
                                                      162/65
2020/0190736 A1   6/2020  Wucherer et al.

OTHER PUBLICATIONS

Russian Office Action, Ser.No. 2019120428/03, dated May 26, 2020.
Chinees Office Action, Ser.No. 201780086856.7, dated Aug. 5, 2020.

* cited by examiner

| Experiment | Drive | Pressure | Duration in milliseconds (1/1000s) | | fast venting |
|---|---|---|---|---|---|
| | | | open | close | |
| 1 | spring-closing | 5 | 41 | 33 | outside chamber |
| 2 | spring-closing | 6 | | | outside chamber |
| 3 | dual-action | 6 | 21 | 21 | outside chamber |
| 4 | dual-action | 5 | 23 | 20 | outside chamber |
| 5 | dual-action | 5 | 27 | 20 | outside chamber |
| 6 | dual-action | 5 | 21 | 20 | outside chamber |
| 7 | dual-action | 4 | 27 | 24 | outside chamber |
| 8 | dual-action | 4 | 24 | 45 | inside chamber |
| 9 | dual-action | 5 | 20 | 39 | inside chamber |
| 10 | dual-action | 5 | 19 | 38 | inside chamber |
| 11 | dual-action | 5 | 20 | 43 | inside chamber |
| 12 | dual-action | 5 | 132 | 235 | standard drive, no change |

Fig. 6

METHOD FOR SEPARATING FIBERS

CROSS-REFERENCE TO RELATED APPLICATIONS

This application is the U.S. national phase of PCT Application No. PCT/EP2017/083129 filed on Dec. 15, 2017, which claims priority to DE Patent Application No. 10 2016 125 446.0 filed on Dec. 22, 2016, the disclosures of which are incorporated in their entirety by reference herein.

TECHNICAL FIELD

The present invention relates to a method for separating fibers, especially a method for the extracting of fibers from a fiber composite or a fiber composite material by the use of cavitation. The method according to the present invention can be used in the field of the paper industry or in the recycling industry, for example in order to be able to recover the fibers (raw materials) contained in the composite materials of paper products and use them in paper production or recycling. Furthermore, it may be employed in other applications for the separating of fibers in various industries.

BACKGROUND

A repeat use of fibers of scrap paper, for example, spares the natural resources and is a decisive factor for environmental protection, and furthermore it also saves on water and energy and generates fewer harmful emissions and waste in the production process as compared to the production of primary-fiber paper.

Methods for recycling, especially methods for separating fibers, are known in the prior art. The applicability of these methods depends substantially on the fiber quality achieved for the recycled fibers and the resource input, especially the energy expenditure to carry out the method.

During the production of paper products, for example in the field of packaging materials, the percentage share of composite materials and coated papers is increasing as compared to wastepaper. Familiar examples of this are composite packages such as beverage cartons consisting of at least two materials, containing cardboard as the outer layer of the package and aluminum and/or a plastic layer as the inner layer of the package. These two materials are bonded together such that a separation by the mere hand is impossible.

The recycling of these packaging materials, but also other paper products with an increasingly higher fraction of composite materials, due to the separating or isolating of the fibers contained therein (raw material), is almost impossible with the methods known in the prior art, or only possible with very large energy expense.

Typically, in the methods known in the prior art, the wastepaper is wetted with water in a pulper and steeped under mechanical action, so that the fibers swell up and the material contained on the paper fibers is separated. The pulper has rotors for the mixing, which increase the internal pulp friction, resulting in an improved separation of the fibers.

DE 10 2011 083 667 A1 discloses a method for the wetting of fiber material by means of a device comprising at least one housing, having at least one closable opening, as well as a rotor for the mixing of the housing contents.

The methods known in the prior art have the drawback of requiring too long a treatment time for the steeping and the swelling for the separation of the fiber composites or the fiber composite materials. This means that the rejects separated from the wastepaper and thus from the fibers, such as e.g. plastic, aluminum foil, and wax, are needlessly further crushed and can only be separated with difficulty from the actual recycled fibers by additional processing steps and at large expense. In this regard, the amount of usable fibers drops significantly with the length of the treatment time of the fiber composite and the fiber composite materials. Furthermore, the fibers may in this way become so crushed and/or damaged by the internal pulp friction that the yield and quality of recyclable fibers are reduced.

Furthermore, too long a treatment time also has a negative impact on the fibers themselves and the associated condition and strength properties of the fibers.

Long fibers have a tendency to break during overly long treatment time, which consequently leads to a reduced fiber quality. Moreover, the fibers are significantly altered in their shape, particle size, and length by the methods typically employed in the prior art, which leads to a reduced fiber quality and accordingly a lower yield of recyclable fibers.

In order to prevent a reduction in fiber quality and a loss of recyclable fibers due to overly long treatment time, the fiber composite material is prepared only for a very short time in the pulper in the methods of the prior art. These methods have the drawback that, due to the short treatment time, a large fraction of the fiber composites or the fiber composite material is not separated and has to be taken along with the rejects to the further recovery/separation in downstream sorting and cleaning facilities. This results in a loss of high-value fibers and in increased operating costs for the processing/separation and disposal of the rejects.

Given this background, the problem which the invention proposes to solve is to overcome the drawbacks of the prior art, at least in part. This problem is solved by a method as claimed in claim 1. Preferred embodiments of the invention are the subject matter of the dependent claims.

SUMMARY

Accordingly, the invention relates to a method for separating fibers, especially a method for extracting fibers from a fiber composite or a fiber composite material by means of cavitation and utilizing at least one container with a predetermined receiving volume as well as at least one vacuum pump, which is connected via a vacuum line and a valve to the container volume. By fibers is meant here a fine or thin threadlike formation, which consists of a plant or animal raw material through chemical and/or mechanical methods or may also be created synthetically. These fibers, especially paper/cellulose fibers, represent the raw material for paper production and are combined with other materials especially in fiber composites or fiber composite materials in the materials to be recycled. Fiber composites or fiber composite materials represent a solid bonding of different materials. Paper/cellulose fibers as part of a composite are combined with other materials, e.g., an aluminum coating, such that they are practically merged in a single unit. Thanks to the method of the invention, this unit/composite is broken up by cavitation and both the paper/cellulose fibers and the other composite materials are in separate form. By cavitation is meant a process based on the rate of gas bubble breakup, wherein gas bubbles in liquids are increased in their volume and implode during an explosive pressure equalization when a pressure change is created, especially when a vacuum is created. Due to the imploding of the gas bubbles, the increased volume of the gas bubbles is flooded with the liquid, so that kinetic energy acts on the fiber composite or the fiber composite materials, and they are separated from each other. By explosive pressure equalization is meant a swift equalization of the pressures between the container internal pressure and the pressure outside the container within a range of 0.001 s to 1 s.

The method according to the invention is distinguished in particular by a cavitation process with which preferably fiber/fiber bonds and fiber/nonfiber bonds, i.e., coatings of any given type, are separated from each other. In particular, the non-fiber containing compounds on fibers (such as PE film, aluminum foil, barrier coatings, etc.) are separated from each other practically fiber-free and over a large area, i.e., residual adhesions of a residual fiber fraction on these materials from an original fiber composite are at least reduced or entirely avoided. Furthermore, fiber agglomerates or classical fiber/fiber connections are broken down into individual fibers. This breaking down also occurs for special fiber compounds which were for example treated or impregnated with special agents (wet strengtheners, resin, etc.) and which were deemed to be nonseparable in the prior art—or only separable with very large energy expense.

The method according to the invention is especially designed to separate composite materials that have been agglutinated or coated (extruded) with a fiber fleece from each other in an almost fiber-free state, and especially over a large area. This is accomplished by this method in a gentle manner, without needlessly crushing the composite materials dissolved in this way, as already known in the former processes. This attribute serves for a subsequent sorting/ separation of different materials, in order to channel the respective resulting different fractions to their own recycling circuit, and thus it serves for resource and energy efficiency to a considerable degree.

Furthermore, with the method according to the invention it is possible to dissolve fiber connections which because of their altered properties (special pretreatment, such as hydrophobic treatment) or are based on very "durable" fiber composites, and are presented to the recycling process. In the prior art, this is only possible with a large energy expenditure or for the most part is impossible, in the case of wet-strength treated types of fiber or paper.

The method for extracting fibers from a composite is advantageously carried out in a gas-tight closable container, a so-called cavitation pulper. The container (cavitation pulper) is dimensioned adequately in the choice of material, wall thickness, and reinforcement, so that it does not become damaged when carrying out the method with the individual fiber dissolving cycles under different pressures by the evacuating (expansion) or under explosive pressure equalization (implosion). The pressures needed to create the cavity are provided by at least one conventional vacuum pump known in the prior art. The vacuum pump, installed outside the container, is connected via at least one vacuum line directly to the container. For the generating of a vacuum and thus a negative pressure, advantageously no additional pressurized container is needed. This simplifies the structural layout and reduces the volume of the overall system and results in cost savings. The at least one vacuum line has at least one valve for closing and opening the vacuum line. The valve of the vacuum line is pneumatically actuated. Advantageously, thanks to the pneumatic actuation of the valve of the vacuum line, a targeted and time-coordinated sequence can be accomplished for the generating of the vacuum. This does not rule out further possibilities for the actuation, such as an electro-pneumatic actuation of the valves.

Furthermore, at least one ventilation line with a predetermined cross sectional opening with at least one valve is used. The valve of the ventilation line has a closed and an open state, where in the open state air can pass through the valve and in the closed state the valve is closed such that no air can pass through the valve. The valve of the ventilation line can be switched in a time range of 19 ms (milliseconds) to 41 ms from the closed state to the open state. The valve is switched to the switching state in which air can pass through the valve. Furthermore, the valve of the ventilation line can be switched in a time range of 20 ms to 45 ms from the open state to the closed state. The valve in this case is switched to the switching state in which the valve is not passable to air. The valve is preferably pneumatically actuated. Advantageously, thanks to the pneumatic actuation of the valves, a targeted and time-coordinated sequence can be accomplished for the generating of the vacuum. This does not rule out further possibilities for the actuation, such as an electro-pneumatic actuation of the valves.

The valves used (fast flaps) in the ventilation lines are modified valves of the prior art for the opening and closing of pressure or air lines. The valves known in the prior art have the drawback that they do not achieve the swift opening speeds in order to provide the cavitation needed for the method of the invention. Only thanks to the fast opening speeds is it assured that the pressure in the container interior being evacuated is swiftly equalized with the pressure outside the container. The modified valves have an air chamber, a valve inlet, and a valve outlet, respectively connected to interior guide pipes. Furthermore, the valve has an inner cylinder chamber, in which the air is introduced from the valve inlet. In the inner cylinder chamber, a piston is mounted movably in rotation, making contact with the two guide pipes. The valve inlet and the valve outlet have a diameter in the range of at least ¼" inch (6.35 cm) to ¾" inch (19.05 mm), preferably in the range of ½" inch (12.7 mm) to ¾" inch (19.05 mm), especially preferably one of ¾" inch (19.05 mm). Thanks to the modified design of the valve inlet and the valve outlet, as compared to the valves known in the prior art, which have a valve inlet of ¼" inch or less, the piston is moved significantly faster, which enables a faster switching of the air through it. Furthermore, the cylinder chamber has been modified in its volume and the air outlet hole has been modified, which advantageously ensures an improved air outlet from the valve.

The method according to the invention involves at least steps i) to iv), which shall be described below. Furthermore, step iv) comprises at least two further substeps v) and vi).

i) The container (cavitation pulper) is filled with a predetermined quantity of water and at least one fiber composite or fiber composite material. Alternatively, the container may already be filled with a fiber composite/water mixture, which was produced already in a process step prior to this and in a different container from a fiber composite or a fiber composite material with water. For the filling, for the ventilation and the venting, as well as for the emptying of the container, this is provided with preferably five gas-tight closable openings. These consist of a filling cover with all-around rubber seal for the filling with the fiber composites or fiber composite materials, and an emptying opening for the removal of the recyclable fibers and for the separation of rejects. Furthermore, the container has a dilution line for the supply of water and at least one vacuum line with a valve. The vacuum line is connected to at least one vacuum pump, in order to produce a container internal pressure different from the pressure outside the container (container ambient pressure). Furthermore, the container has at least one ventilation line with at least one valve (fast flaps), such that with the opening of the valve in the ventilation line a pressure equalization is carried out between the container internal pressure and the container ambient pressure. By the fast opening and closing of at least one valve in at least one ventilation line, the explosive pressure equalization occurs, and a cavitation is created upon simultaneous producing of a vacuum by means of the vacuum pump between the fiber composite or the fiber composite material. The filling cover with all-around rubber seal is a hydraulically and/or electrically operated cover for closing the fill opening of the container. The movement sequence of the cover runs from an open position, which does not lie on top of the fill opening to be closed, to a closed position, which lies on top of the fill opening to be closed. The filling cover travels from the open position to the closed position via running wheels mounted on the cover frame, which run in a straight guide mounted on the container. The filling cover prior to each traversing is lifted at the start of the movement sequence by a few millimeters concurrently in the vertical direction, so as advantageously not to damage the slightly projecting and encircling rubber seal installed in the underside of the filling cover by the rubbing of the travel of the filling cover from the open to the closed position or from the closed to the open position. By traversing is meant the movement sequence of the cover from the open to the closed position or from the closed to the open position with prior or subsequent lifting or lowering in the vertical direction. The positioning state of the cover is detected by sensors, which are chosen from a group comprising electrical, magnetic, mechanical, electromechanical and/or optical sensors. At the front edge of the cover there is installed a brush strip, which wipes away contaminants located on the upper edge of the cover opening during the backward and forward movement of the cover, so as to assure advantageously a perfect seal of the container by means of the filling cover. By the front edge of the cover is meant the edge having the least distance from the container opening during the travel from the open position in the direction of the closed position.

ii) After the filling of the container with fiber composites or fiber composite materials, the container is closed in a gas-tight manner such that no container ambient air can get into the container or a container internal pressure different from the pressure outside the container can be produced by the at least one vacuum pump. Thanks to the gas-tight closure of the fill opening (filling cover) of the container, the first necessary vacuum (negative pressure) is advantageously achieved, in order to generate a corresponding cavitation by the subsequently performed explosive pressure equalization.

iii) After the closing of the container in gas-tight manner, a mixing of the water with the fiber composite or the fiber composite material is performed by the use of mechanical energy, especially by stirring. The stirring is done by a stirring mechanism installed in the container. Advantageously, the constant stirring of the pulp suspension by means of the stirring mechanism improves the liquid distribution and the blending of the pulp suspension, so that the effect of the cavitation is intensified. The stirring is done at an average rotor speed, controlled by a frequency converter, in a range of 1 l/min to 1000 l/min, preferably in a range of 1 l/min to 500 l/min, especially preferably in a range of 200 l/min to 500 l/min. Alternatively, for a better liquid distribution, a conventional rotor can be installed in the container, which is driven by drive units known in the prior art, such as induction motors with belt pulley and belt, or by means of gearing or by means of a direct drive with predetermined breaking point for the rotor axle. For the gas-tight sealing of the rotor, a seal known from the prior art is used, such as an axial face seal.

iv) By the method according to the invention, kinetic energy is generated in the fiber composites or in the fiber composite materials by two substeps (v) and (vi). The substeps (v) and (vi) are dependent on the type and quantity of the fiber composites or fiber composite materials to be processed and they are carried out at least once for the fiber quality required by the subsequent recycling and may be repeated at least one further time and/or further times in order to boost both the fiber yield and the fiber quality.

v) In a first substep (v), by the evacuating of the air from the container via at least one vacuum line by means of at least one vacuum pump, a container internal pressure different from the pressure outside the container is produced. The container internal pressure is lowered to a value between −700 hPa and −950 hPa. Thanks to the negative pressure created in the container and the creating of the vacuum, the gas bubbles present between the individual fibers of the fiber composite or the fiber composite material steeped in the water increase in their volume. Due to an imploding of these gas bubbles, extreme conditions are briefly created in the inside of the fiber composite, between the fibers, and also on the adjacent surfaces, with high pressure values and temperatures. Thanks to these transient extreme conditions inside the fiber composite, even hard materials are attacked and eroded.

vi) In the second substep (vi), a pressure equalization is produced in the container interior in order to generate the aforementioned cavitation in the fiber composite or in the fiber composite material. Advantageously, a cavitation is created by the explosive pressure equalization due to the opening of at least one valve in at least one ventilation line. Due to the cavitation, the gas bubble collapses (implodes), so that the previously increased volume is flooded with a liquid, preferably water. The kinetic energy of this space-occupying liquid ends up as impact energy in the form of a liquid pressure leading centrally through the formerly existing gas space. The resulting needle-like energy shocks bring about a "blasting" of the fibers and rejects from the fiber composites or fiber composite materials and thus result in a separation of the input material. The process of opening the at least one valve in the ventilation line and the almost explosive pressure equalization accompanying this take place in a time range of 0.001 s to 1 s. Thanks to the swift opening of the valve, the collapsing of the gas bubble and the associated occurrence of the kinetic energy within the fiber composite are further strengthened and the yield of recyclable fibers is increased. Advantageously, a separating of the fibers and rejects is facilitated and further accelerated by the increased kinetic energy available, so that the treatment time of the fiber composites or fiber composite materials is significantly decreased on the whole and the fiber composites or fiber composite materials can be subjected to a much more gentle treatment for the separation. This results in both an improved yield of recyclable fibers and an enhanced quality of the recyclable fibers, as well as a significant reduction in the energy consumption of the method of the invention due to the reduced treatment time.

In particular, in a further embodiment, step (vi) preferably occurs within a time range of 0.001 s to 0.1 s, especially preferably within a time range of 0.001 s to 0.01 s.

In one embodiment of the invention, the valve is connected via the vacuum line to at least one check valve. Due to the check valve, the valve and thus the vacuum line are closed in one direction, while in the other direction it is released from the suction of the vacuum pump. When the vacuum pump is switched on, the sealing flap is lifted from its flap seat and the gases and/or air present in the container are pumped out by the suction effect of the vacuum pump. When the vacuum pump is switched off, the sealing flap is pressed by its own weight into its flap seat and thus is closed off air-tight. No further air exchange occurs in this respect between the container surroundings and/or the vacuum line with the vacuum pump and the container interior and the vacuum inside the container interior and the pressure remains stable. The design of the check valve described here represents only one exemplary description and is not limited to this technique. Likewise, valves having check elements containing balls, cones and membranes, for example, can be used. The check mechanism or the activating of the closure element can also be done by means of a spring.

The presence of the check valve makes it possible to maintain constant container internal pressure, especially the negative pressure, so that thereafter the air flowing in during step (vi) establishes cavitation between the fibers of the fiber composites or fiber composite materials. Thanks to the check valve, a vacuum loss via the vacuum line is prevented during a long-lasting vacuum in the container. Furthermore, the check valve helps to protect the vacuum pump.

In a further embodiment of the invention, the valves in the ventilation line are switched in a time range of 19 ms to 27 ms, preferably in a time range of 19 ms to 24 ms, from the closed state to the open state and/or in a time range of 20 ms to 39 ms, preferably in a time range of 20 ms to 33 ms, especially preferably in a time range of 20 ms to 24 ms, from the open state to the closed state.

The invention relates to a method for the processing of at least one fiber composite, chosen from a group of fiber systems containing natural fibers, such as plant fibers and/or mineral fibers and/or chemical fibers, formed from natural polymers of plant or animal origin, natural polymers and/or synthetic polymers and films made of natural polymers and/or synthetic polymers and/or metal and mixtures thereof.

The invention also relates to a method in which besides the water and the fiber composite there is added at least one further additive, which is chosen from a group comprising acids, alkalis, dispersants, wetting agents, and combinations thereof.

Furthermore, the invention relates to a method in which the fiber composite has been crushed before being placed in the container and the individual pieces of the fiber composite preferably have an average maximum edge surface of less than 10000 mm$^2$, preferably less than 100 mm$^2$ and especially preferably less than 25 mm$^2$. It is advantageous that this accomplishes an improved penetration behavior of the liquid into the fiber composite, and in this way the penetrating liquid better separates the fibers of the fiber composites or fiber composite materials by means of cavitation and the gas bubble breakup. The reduced edge surface produces an increased area of attack and prevents overlapping portions, so that the yield and fiber quality are improved by the method of the invention.

When the method according to the invention is used for the processing of pulp, the fibers being used are less damaged. The fine branching of the fiber structure in particular on the surface of the individual fibers is less damaged than in methods of the current art that are used for the same purpose, namely, to make the pulp pumpable and to separate the fibers.

In the filtrate of the pulp pumpably dissolved by means of the described method, the chemical oxygen requirement (CSB) for breaking down the ingredients present in the filtrate is reduced as compared to the state of the art dissolver systems with the same degree of dissolving and the same feedstock by 2 to 42%.

The Shopper-Riegler drainage resistance ('SR) is reduced by using the described method as compared to state of the art dissolver systems with the same degree of dissolving and the same feedstock by 1 to 8 points.

Among other things, this accomplishes a boosting of the yield of the raw material used, reduces the drainage resistance of the fiber material thus produced, and hence increases the production speed of the papermaking machinery. Furthermore, a reduced requirement for the consumption rate of germ-reducing agents (biocides) and thus less burden on the environment is achieved. The reduced burden on the wastewater treatment plant due to less freight from the paper plant also represents a further benefit of the present invention.

In particular, the edge surface of the individual pieces of the fiber composite increases substantially proportional to the receiving volume of the container, which thus is reflected in a time-constant process duration. A constant edge surface of the individual pieces of the fiber composite with simultaneous increasing of the receiving volume of the container may result in a slowing down of the process.

In one embodiment of the invention, step (iv) is repeated for a predetermined number of runs. By a repeating of step (iv), an increasing of the fiber yield with enhanced fiber quality is accomplished due to the more gentle treatment. For this, the first run of step (iv) occurs under the differential pressure with an effective time of 2 minutes, especially 3 minutes, preferably 5 minutes. In particular, in the first run of step (iv), the differential pressure (negative pressure) generated by the evacuating of the container is maintained for the effective times, while the material suspension is thoroughly mixed (homogenized) while stirring by means of the rotor. After this, cavitation is achieved between the fibers of the fiber composites or fiber composite materials by the opening of the valves in the ventilation lines and the swift pressure equalization achieved in this way. The gas bubbles between the fibers of the fiber composites or fiber composite materials collapse and become filled with liquid, by which a separation occurs. Advantageously, the fiber composites or fiber composite materials are prepared in such a way by the first run with longer effective time that the method of the invention is more gentle to the recyclable fibers. This results in a better fiber yield and fiber quality.

In a further embodiment of the invention, step (iv) is repeated under variation of the effective time at least in four further runs, especially in nine further runs, preferably in a range of fourteen to twenty five further runs, especially preferably in twenty nine further runs. Thanks to the repeating of step (iv) with the evacuating of the container and the generating of the differential pressure, and with the subsequent swift opening of the valve in at least one ventilation line, the yield of recyclable fibers which have been separated from the fiber composite or the fiber composite materials is significantly boosted.

In yet another embodiment of the invention, step (v) is completed in a first run in a time range of 60 s to 120 s, especially in a time range of 80 s to 120 s, preferably in a time range of 100 s to 120 s, especially preferably in 120 s.

In one embodiment of the invention, the negative pressure inside the container after step (v) is at most −950 hPa, especially at most −700 hPa, preferably at most −500 hPa. The magnitude of the negative pressure to be established results from the nature, condition, and quantity of the fiber composite or fiber composite material to be dissolved. The introduced kinetic energy of the water upon imploding of the gas bubble is higher when the negative pressure is chosen to be higher. This results from the larger bubble volume forming under higher negative pressure. Advantageously, less energy is needed thanks to the use of a lower pressure to produce the negative pressure, so that costs are saved. In this regard, the level of the negative pressure is chosen such that a positive ratio is established between the result of the dissolving and the fiber yield at an appropriate time and at low energy expense. Depending on the fiber composite or the fiber composite material, the combination of less negative pressure with more runs of step (iv) or more negative pressure in conjunction with fewer runs of step (iv) may lead to a better fiber yield.

In one embodiment, the material filled into the container consists of a material suspension, consisting of at least one liquid, containing water or water and at least one further additive, and a fiber composite as the solid fraction, which in a ratio of liquid to solid fraction lies in a range between 2% and 35%, preferably in a range between 5% and 25%, especially preferably in a range between 8% and 22%. The ratio of liquid to solid fraction was determined with methods according to DIN 54 359. It has proven to be advantageous that a good separation of recyclable fibers of the fiber composites or fiber composite materials is established with this ratio of liquid to solid fraction. Advantageously, the generating of the cavitation process is improved with these consistencies. For consistencies greater than the indicated ranges, the suspension contains too low a fraction of water, so that the performance of the cavitation process is impeded.

In a further embodiment, after step (vi) the acceleration of the gas flowing into the container after the opening of the valve or valves in the valve cross section lies in a range between 20 m/s² and 20,000 m/s², especially in a range between 2000 m/s² and 20,000 m/s², preferably in a range between 6000 m/s² and 16,000 m/s², especially preferably in a range between 8000 m/s² and 16,000 m/s². Furthermore, the flow velocity of the gas flowing into the container after the opening of the valve or valves after step (vi) lies in a range between 43 m/s and 1000 m/s, especially in a range between 100 m/s and 750 m/s, preferably in a range between 200 m/s and 500 m/s, especially preferably in a range between 300 m/s and 500 m/s. The gas bubble breakup between the fibers of the fiber composites or the fiber composite materials is intensified by the higher flow velocities and the overall process is optimized. On the other hand, slower flow velocities worsen or hamper the process and thus the gas bubble breakup, or prevent cavitation from occurring.

In one embodiment of the invention, the ratio between container volume and the effective cross sectional area of the ventilation line or the valve(s) in the ventilation line lies in a range between 10,000 and 100,000, especially in a range between 35,000 and 75,000, preferably in a range between 50,000 and 60,000 and especially preferably in a range between 52,500 and 57,500. The ratio is determined by formula 1:

$$\text{ratio} = \frac{V_C}{N * \left[\left(\frac{D_V}{2}\right)^2 * \pi * h\right]} \quad \text{Formula I}$$

Where:
ratio is the ratio being determined;
$V_C$ is the volume of the container;
N is the number of valves connected via the ventilation line;
$D_V$ is the diameter of the valves; and
h is the thickness of the closure flap of the valve.

The method according to the invention is based on cavitation. In order to create cavitation between the fibers in a fiber composite or fiber composite materials, the air in the container with a given volume must first be evacuated. In the following step, the pulp suspension is subjected to air via at least one rapidly switched valve in at least one ventilation line, in order to create the gas bubble breakup between the fibers in the fiber composites or fiber composite materials. In order to create the positive effect of the cavitation, the number of ventilation lines to be provided with the corresponding valves and their effective cross sectional area is oriented to the volume of the container being evacuated. Depending on the layout and size of the container, the number of ventilation lines to be provided with corresponding valve is at least one unit. In particular, the ratio between the container volume and effective cross sectional area of the ventilation line or the valve(s) means that the necessary speed of the pressure equalization in the container from the negative pressure inside the container to the ambient pressure outside the container occurs so fast that a gas bubble breakup (cavitation) occurs between the fibers of a fiber composite or fiber composite material and they become separated.

The method according to the invention is also characterized in that contaminated fiber connections, for example, or also fiber/nonfiber connections (such as used beverage cartons, used "coffee to go" cups, etc.) and/or other kinds of admixtures in original fiber compositions entail a reduction in the microorganisms present in the feedstock during the separation by cavitation, which can be reduced by the method according to the invention. Thus, the total measured germ count (molds, yeasts and bacteria) is reduced by 1 to 40%, which is due among other things to the better separation of the different fractions. This produces the benefits, among others, that the consumption rate of microorganism-reducing agents (biocides) can be reduced and this means less burden on the environment. Moreover, there is a reduction in odor-producing contents of the dissolved pulp and less burden on the wastewater treatment plant.

The method according to the invention further offers the possibility of increasing the internal strength and condition of a vegetable fiber, i.e., its strength properties, by the cavitation process during the following formation of a new sheet or fiber fleece.

This produces the benefits that a vegetable fiber treated by the cavitation process and thereby separated undergoes a more intense fibrillation. Thanks to the cavitation introduced at the fiber surface, fibrils deposited on the fiber wall during previous drying processes (keratinization) are removed and the fibrils rendered reusable for the later fiber/fiber connection. Among other things, this means that the strength properties (such as breaking load, tear length, bursting pressure, etc.) of a sheet made from this pulp are increased by 2 to 20% with respect to a sheet made from pulp of the same origin and produced in the prior art.

Finally, the method according to the invention shows that vegetable fibers which have accordingly been rendered pumpable have a reduced swelling duration. It has been found in experiments that these required less than three minutes for the same pulp composition, as compared to 20 minutes with a plant equipped according to the prior art. In this way, downstream equipment for treatment of the pulp rendered pumpable requires less energy to achieve the same result.

This yields the benefits, among others, that the reduced grinding resistance of the pulp makes possible a saving for the energy to be used in the grinding by means of refiners of up to 15% and also optionally the need for chemicals may be less, both in the mass of the pulp used to produce the sheet and in a subsequent surface refining step, than for pulp prepared by means of prior art equipment.

A further possibility offered by the method according to the invention is that, for example during the cavitation process, vegetable fibers can be introduced into the dissolving process in order to confer supplemental or optimized properties on them. This yields the benefit that vegetable fibers are conditioned within the method according to the invention, i.e., substances altering the fiber properties may be introduced into the vegetable fiber depending on the fiber quality, fiber structure or fiber origin. These additives may involve, for example, coloring, hydrophobing, fluorescing or strength-boosting agents, or additives which may be outfitted with a nano-sensor or nano-actuator.

BRIEF DESCRIPTION OF THE DRAWINGS

Various embodiments of the invention shall be explained below with the aid of the drawings, these merely explaining the invention as an example and not representing any limitation of the general teaching of the invention in regard to modifications. There is shown in:

FIG. 6 a schematic representation of the opening speed of the valve 341 of the ventilation line 340.

DETAILED DESCRIPTION

Figure 1:
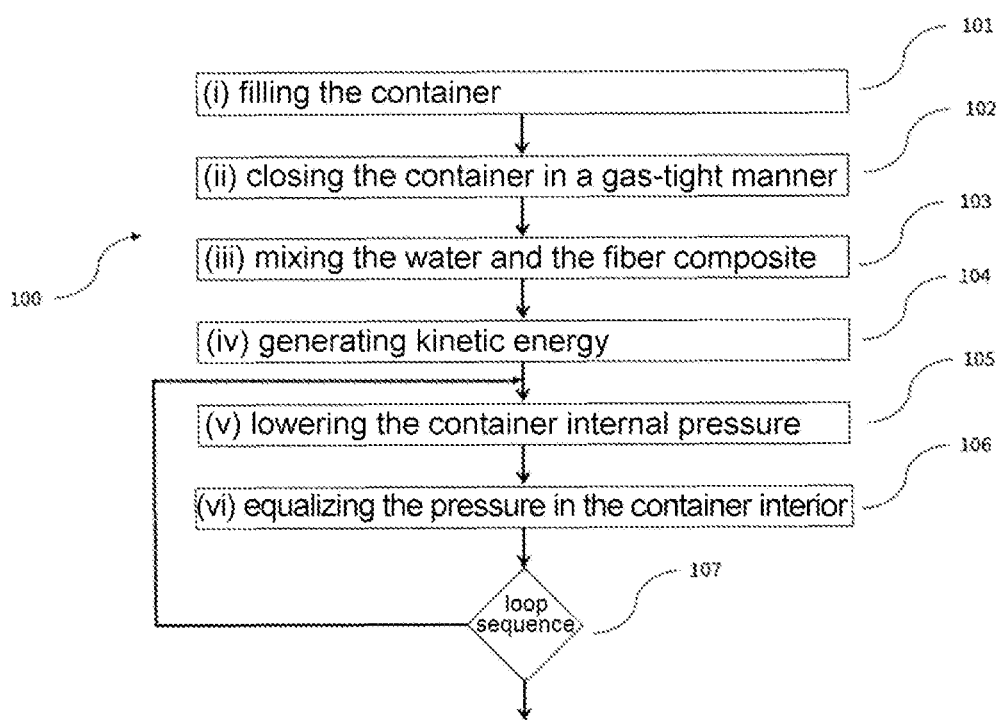
FIG. 1 a flow chart to show one embodiment of the method 100 according to the invention.

FIG. 1 shows a flow chart to show a first embodiment of the method according to the invention 100. In particular, this first embodiment of the method 100 is carried out by means of the embodiments of the device as shown in FIGS. 2 to 5.

Before filling the container 101 with a predetermined amount of water and at least one fiber composite or fiber composite material, the sealing water pump 240 is switched on to provide the sealing water via the sealing water line 241 to the axial face seals of the rotor 242 and at the axial face seal of the vacuum pump 243. The sealing water is provided with at least a minimum pressure of six bar. With a sealing water pressure below the minimum pressure, the rotor and the vacuum pump 220 are blocked and not ready to operate. Furthermore, the unloading gate 320 is closed, being the unloading opening for removal of the recyclable fibers and separation of the rejects. For the raising and lowering of the filling cover 330, as well as for the travel of the filling cover 330 along the direction of movement 333 from the closed position 331 to the open position 332, the hydraulic power unit 232 is switched on. After this, the filling cover 330 is lifted in the vertical direction by a few millimeters and moved into the open position 332. The main motor 210 is then switched on, by which the rotor turns with the predetermined speed. The speed depending on the fiber composite or fiber composite material lies in a range of 1 rpm to 500 rpm. This embodiment pertains to the use of an induction motor 210 in combination with belt 213/belt pulley 211, 212 or a motor/gearing layout. Furthermore, the valve 341 (rapid flaps) in the ventilation line 340 is opened. The inductive flow meter 251 is used to set the quantity of water, whereby the pulp density needed for the process in a ratio of liquid to solid fraction lies in a range between 2% and 35%, preferably in a range between 5% and 25%, especially preferably in a range between 8% and 22%. After this, liquid (water) is brought in via the opened water intake valve 252 and fiber composite or fiber composite material is added in dependence on the pulp density to be achieved via the movable and gas-tight closable filling cover 330.

After the filling of the container 310, the filling cover 330 is closed gas-tight 102 and the hydraulic power unit is switched off. During the gas-tight closing of the filling cover 330, a preliminary mixing of the pulp suspension occurs by the turning rotor.

After the gas-tight closing of the container 310, the step of mixing the pulp suspension 103 occurs, making use of mechanical energy, especially by stirring by means of the rotor, for a period of at least two minutes. After the given mixing time has passed, the valve 341 of the ventilation line is closed.

After the mixing of the pulp suspension, kinetic energy is generated in the fiber composite 104. For this, the vacuum pump 220 is switched on in order to establish a differential pressure (negative pressure) in the container interior.

In substep (v) 105 the vacuum pump 220 is used to generate a differential pressure (negative pressure) within the container 310 of at most −950 hPa, especially at most −700 hPa, preferably at most −500 hPa. The magnitude of the differential pressure depends on the fiber composite or fiber composite materials to be dissolved and is dictated in this regard at the start of the method 100. The establishing and the maintaining of the differential pressure (negative pressure) occurs in a first run of step 104 in total with an effective time of 2 minutes, especially 3 minutes, preferably 5 minutes. In this first run, the pulp suspension is blended and homogenized under stirring by means of the rotor while maintaining the differential pressure. Thanks to establishing and maintaining the differential pressure, the volume of the gas bubbles in the liquid is increased. Due to the homogenization, the fibers of the fiber composites or the fiber composite materials take up this liquid, which is water in this embodiment of the invention.

Upon reaching the preset differential pressure (negative pressure) in the interior of the container 310, the ventilation line 340 is explosively opened and closed by the valve 341 in the ventilation line 340. Thanks to the rapid opening and closing of the valve 341 in substep (vi) 106, there occurs an explosive pressure equalization in the container interior. Due to the explosive pressure equalization (vi) 106, the gas bubbles implode and the enlarged volume of the gas bubbles is flooded with water, such that kinetic energy acts on the fiber composite or the fiber composite materials and separates them from each other.

The differential pressure is determined by a pressure sensor 222 inside the container 310.

After the first explosive opening and closing of the valve 341 in the ventilation line 340 within at least a time range of 0.001 s to 1 s, preferably within 0.001 s to 0.1 s, especially preferably within 0.001 s to 0.01 s, and the consequently occurring pressure equalization, the vacuum pump 220 continues to generate a vacuum via the vacuum line 221 and once more produces a negative pressure in the container 310.

Substeps (v) and (vi) are repeated in a loop sequence 107 during continuous running of the vacuum pump 220 in at least four further runs, especially in nine further runs, preferably in a range of fourteen to twenty five further runs, especially preferably in twenty nine further runs. The number of further runs of the valve 341 opening and closing in the millisecond range in the ventilation line 340 is set in dependence on the fiber composite or fiber composite material being used at the start of the method 100.

After completion of the predetermined loop sequence 107, the vacuum pump 220 is switched off and the ventilation line 340 is opened by the opening of the valve 341 in the ventilation line 340, whereby a total pressure equalization occurs between the container internal pressure and the container ambient pressure. Furthermore, the hydraulic power unit 232 is switched on and the filling cover 330 of the gas-tight closed containers 310 is lifted in the vertical direction by a few millimeters and moved from the closed position 331 to the open position 332 along the direction of movement 333. After the end of the cover movement, the hydraulic power unit 232 is switched off. With the inductive flow meter 251, the water quantity is set for a further dilution of the pulp suspension and the set water input is introduced by opening the water intake valve 252. Further stirring is done in dependence on the fiber composite or the fiber composite material being used for a further stirring time in a range of more than 0 to 3 min, using an average rotor speed in a range of 1 rpm to 1000 rpm, preferably in a range of 1 rpm to 500 rpm, especially preferably in a range of 200 rpm to 500 rpm. After the end of the further stirring process, the suspension is discharged through the unloading gate 320 and taken on for further processing and/or utilization and/or disposal. Optionally rinsing is done one further time for the draining of the container 310. After the draining of the container 310, the main motor 210 and then the sealing water pump 240 are switched off.

In a further embodiment, a direct drive such as a torque motor/direct motor is used as the main motor 210, first of all adding the water and the fiber composite or the fiber composite material to the container 310 and then switching on the main motor 210 and thus the rotor.

Advantageously, an additional energy saving can be achieved by this further embodiment.

Figure 2:
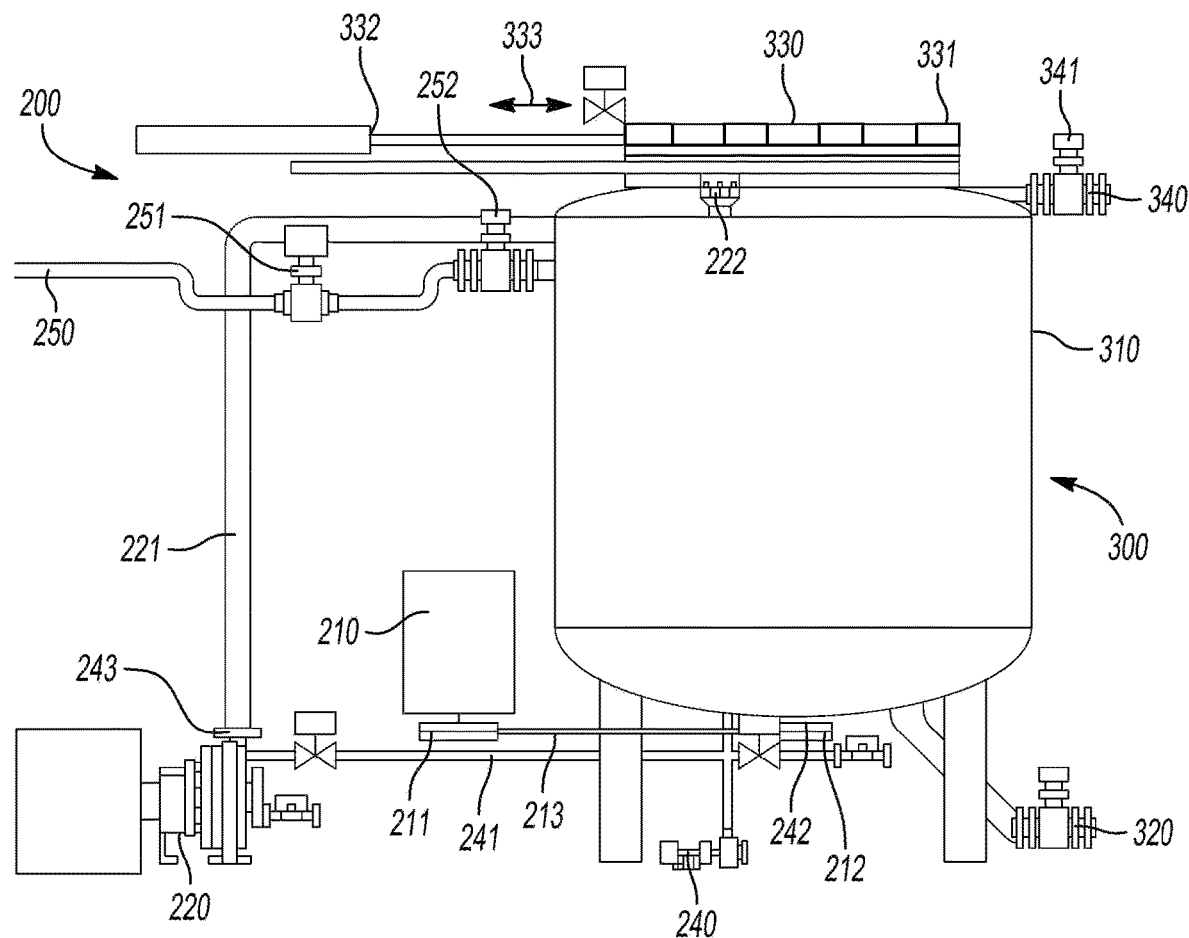
FIG. 2 a schematic representation of one embodiment of the equipment 200 with a cavitation pulper 300 according to the invention.

FIG. 2 shows the schematic two-dimensional representation of an embodiment of the layout 200 with a cavitation pulper 300 according to the invention during the sequence of the method 100 with closed filling cover 330. In this case, the filling cover 330 is situated above the fill opening of the container 310 at the closed position 331. Using the hydraulic power unit (not shown), a hydraulic pressure is provided, whereby the filling cover 330 at the closed position 331 is lifted vertically by a few millimeters and then moved along the direction of movement 333 toward the open position 332. During the filling of the container with fiber composite or fiber composite materials, the filling cover 330 is in the open position 332. After completion of the filling process, the filling cover 330 travels along the direction of movement 333 toward the closed position 331 and is set down above the fill opening, such that the container 310 is closed gas-tight. Furthermore, the layout 200 with cavitation pulper 300 comprises a main motor 210. The drive force of the main motor 210 is transmitted across two belt pulleys 211, 212 by means of a belt 213 to the rotor (not shown) situated inside the container 310. The connection between the rotor and the belt pulley 212 is sealed by the axial face seal 242. For this, sealing water with a minimum pressure of 6 bar is provided by the sealing water pump 240 across the sealing water line 241. Further, the sealing water pump 240 via the sealing water line 241 supplies sealing water to the axial face seal 243 at the vacuum pump 220. The air is sucked out from the container interior by means of the vacuum pump 220 via the vacuum line 221 and thus a vacuum or a differential pressure (negative pressure) is created in the container 310. The pressure sensor 222 determines the differential pressure generated in the container 230. Furthermore, the layout 200 with cavitation pulper 300 comprises a water intake line 250, by which the quantity of water needed for the method 100 is supplied to the container 310 by means of the opening of the water intake valve 252. The inductive flow meter 251 is used to set the water quantity needed for the method 100 in dependence on the pulp density. Furthermore, the water for further dilution of the pulp suspension after the method step (iv) is also supplied via the water intake line 250. Moreover, the layout 200 with cavitation pulper 300 comprises a ventilation line 340 with a valve 341 for the pressure equalization after reaching the differential pressure set. By the explosive ventilation of the container 310 by means of the rapid closing of the valve 341 in the ventilation line 340, cavitation is created in the fiber composite or in the fiber composite materials.

Figure 3:
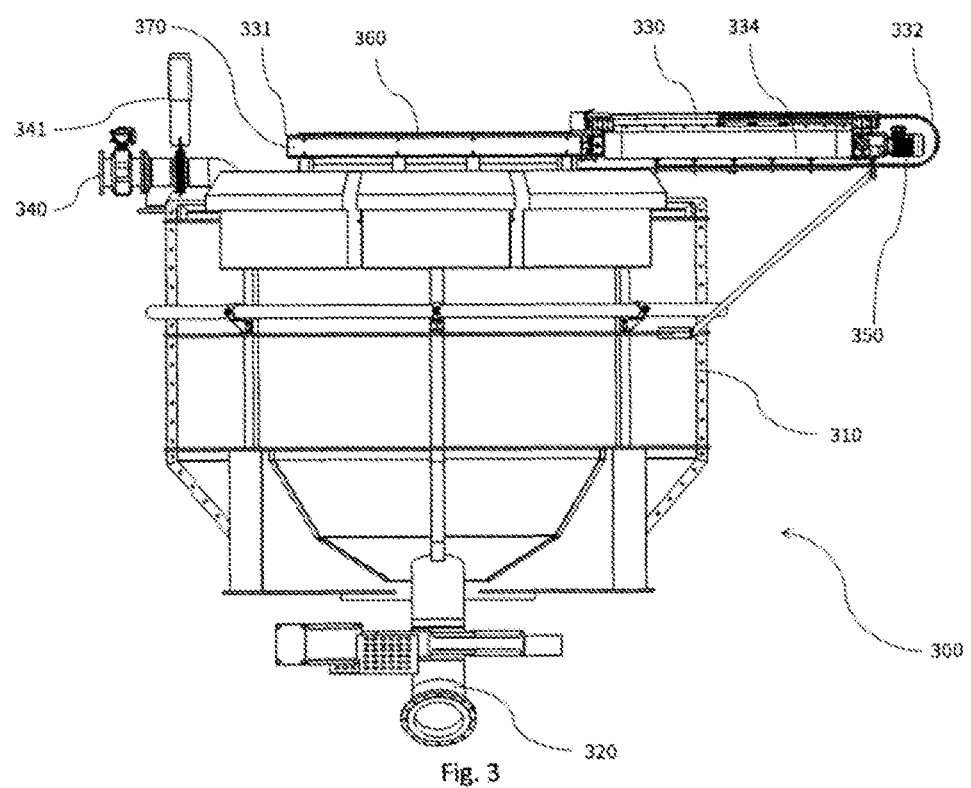
FIG. 3 a schematic representation of one embodiment of the cavitation pulper 300 according to the invention.

FIG. 3 shows the schematic representation of one embodiment of the cavitation pulper 300 of the layout 200 according to the invention in a side view. In this embodiment, the container 310 is shown as open and the filling cover 330 is in the open position 332. The filling cover 330 travels along the direction of movement 333 from the open position to the closed position via the running wheels 371 arranged on the cover frame 334 (not shown), which run in a straight guide 370 arranged on the container 310. Before the start of movement of the filling cover 330 along the direction of movement 333, the filling cover 330 is raised in the vertical direction by a few millimeters advantageously so as not to damage the slightly protruding and encircling rubber seal 360 engaging with the bottom side of the filling cover due to the friction of the movement of the filling cover 330 along the direction of movement 333.

Figure 4A:
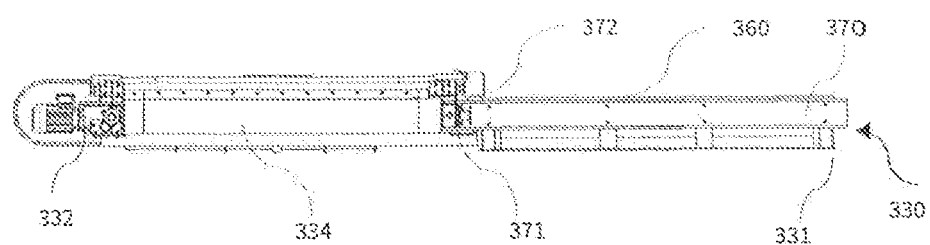
FIG. 4a a schematic representation of one embodiment of the filling cover 330 of the cavitation pulper 300 according to the invention in the side view.
Figure 4B:
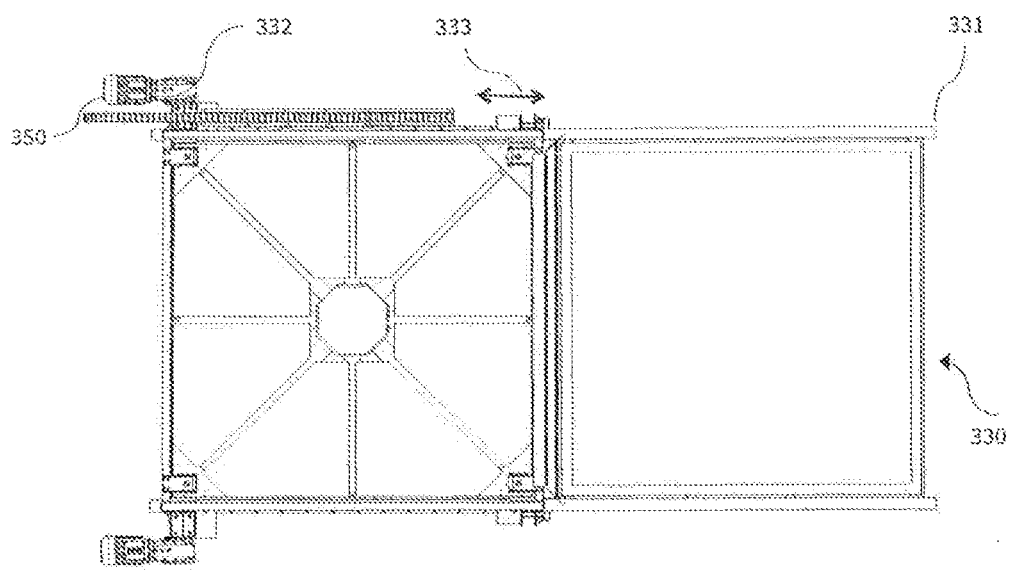
FIG. 4b a schematic representation of one embodiment of the filling cover 330 of the cavitation pulper 300 according to the invention in the top view.

FIG. 4*a* and FIG. 4*b* show a schematic representation of one embodiment of the filling cover 330 of the cavitation pulper 300 according to the invention in the side view and top view. In this embodiment, the filling cover 330 is in the open position 332. The filling cover 330 is driven by the drive 350, which is installed on the cover frame 334, and moved from the closed position 331 to the open position 332 or from the open position 332 to the closed position 331. The drive used may be a motor from the group comprising electric motors, hydraulic or pneumatic motors. The driving force is transmitted by means of belt, chain and/or gearing to the running wheels 371, which run in the straight guide. Prior to the movement of the filling cover along the direction of movement 333, the filling cover 330 is lifted in the vertical direction by a few millimeters advantageously so as not to damage the slightly protruding and encircling rubber seal 360 engaging with the bottom side of the filling cover 330. Impurities on the cover opening of the container 310 are removed by the brush strip 372 installed on the front side of the filling cover 330 during the movement of the filling cover 330 along the direction of movement 333.

Figure 5A:
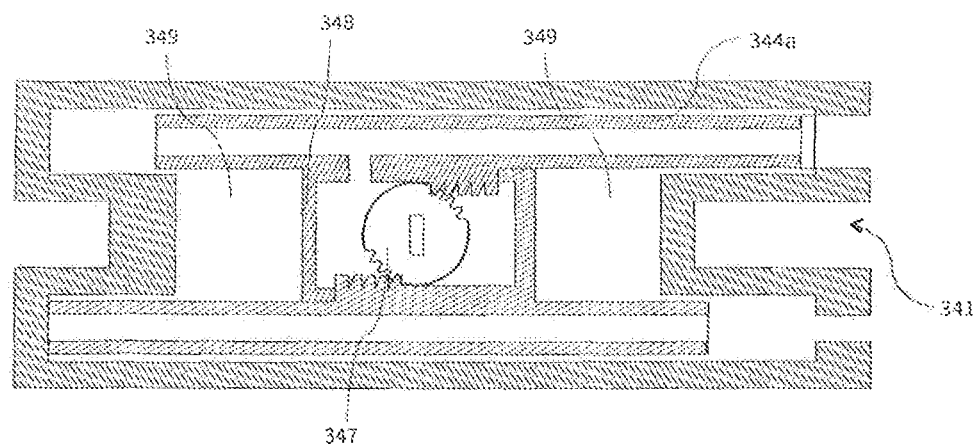
FIG. 5 a schematic representation of one embodiment of the valve 341 of the ventilation line 340 of the cavitation pulper 300 according to the invention.
Figure 5B:
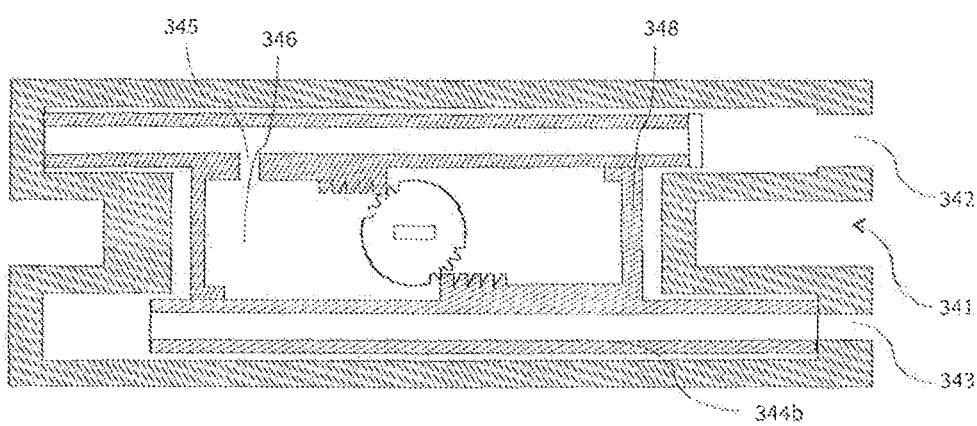

FIGS. 5a and 5b show exemplary embodiments of the modified valves 341 of the ventilation line 340, which are known in the prior art. FIGS. 5a and 5b show the dual-action valve 341, in particular FIG. 5a shows the closed valve 341 and FIG. 5b the open valve 341. Through the connection 342, the valve 341 is exposed to pressurized air, whereby the pressurized air flowing into the guide pipe 344A is conducted through the borehole 345 in the guide pipe 344A into the inner cylinder chamber 346 and the pistons 348 and guide pipes 344A, 244B move away from each other. This has the result that the central switching shaft 347 performs a 90° counterclockwise rotary movement and the flap in the ventilation line 340 attached to it likewise turns by 90° and opens the ventilation line 340.

For the closing of the valve 341, the connection 343 of the valve 341 is exposed to pressurized air and the pressurized air flows through the guide pipe 344B into the two outer pressure chambers 349. The pistons 348 move toward each other and rotate the central switching shaft 347 clockwise by 90° via the toothed rack on the pistons 348.

FIG. 6 shows the opening and closing times of the modified valve 341 of the venting line 340 as determined in switching experiments by a high-speed camera (1000 images per second). In order to generate the cavitation in the fiber composites or fiber composite materials, it is necessary for a pressure equalization to occur between the container internal pressure and the container ambient pressure in a minimal time range. In this regard, the switching times of the different embodiments of the valves were plotted and evaluated under uniform conditions in FIGS. 5a and 5b, in order to determine the fastest opening time. A significant improvement for the opening time by 105 ms to 112 ms is found as compared to the standard drive (experiment 10) in this regard. Advantageously, the cavitation in the fiber composites or fiber composite materials and thus the separation of fibers from the rejects is improved thanks to the faster opening time, which reduces the dissolving time. This reduces the costs for the method of separating fibers of fiber composites or fiber composite materials.

Figure 7:
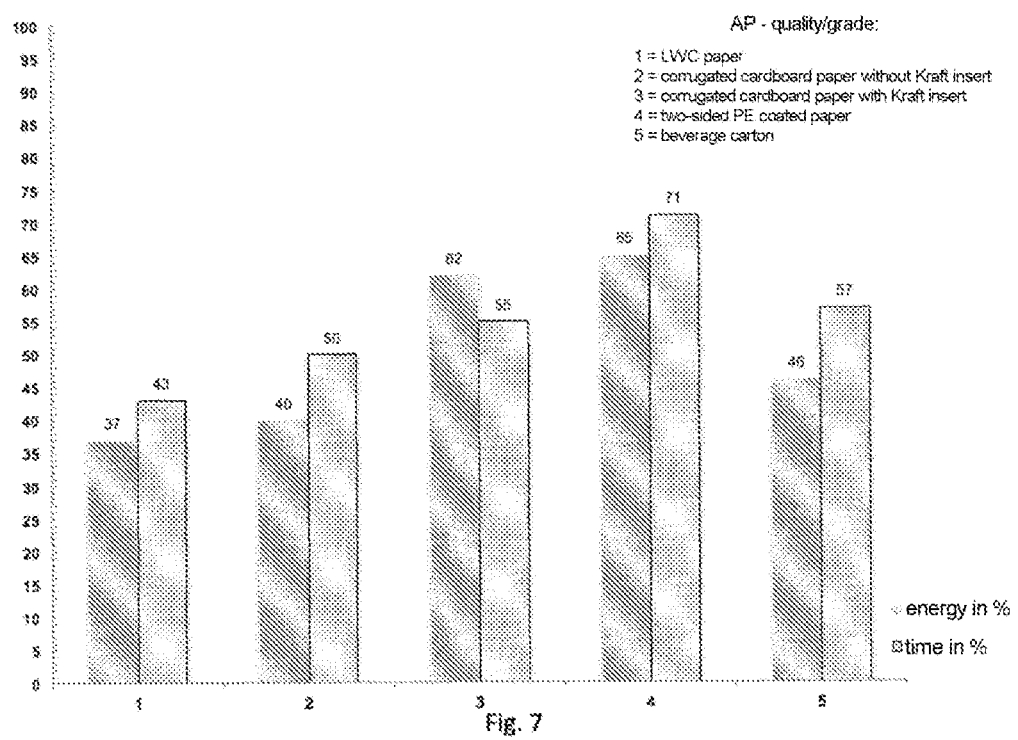
FIG. 7 a schematic representation of the percentage saving potential of energy and dissolving time due to the method of the invention as compared to known methods of the prior art.

FIG. 7 shows the percentage saving potential of the method of the invention in terms of the specific energy consumption when using the cavitation pulper 300 as compared to conventional pulpers known in the prior art in five different series of experiments with five different wastepaper composites to be separated. Furthermore, FIG. 7 shows the percentage savings potential in time, especially in the time for dissolving of fiber composites or fiber composite materials, which was determined by measurements likewise in the five series of experiments. The series of experiments were performed in the experimental layout under identical test conditions with a water temperature of 8° C. and a pulp density of 12.5%. These test parameters do not constitute any limitation or any operating parameters for the functional layout 200, but instead serve merely for test purposes for the series of experiments in the experimental layout. It can be seen from FIG. 7 that a significant energy saving was achieved in all five series of experiments with different wastepaper composites thanks to the use of the inventive method 100 using the cavitation pulper 300 as compared to conventional methods and pulpers. The energy saving here is in the range of 37% for LWC paper to 65% for two-sided PE-coated paper. Advantageously, thanks to the lower energy consumption, the costs for the operating of the method and the plant for separation of fibers from fiber composites or fiber composite materials are lowered. Moreover, the reduced dissolving time is advantageously in a range of 43% to 71% as compared to conventional methods. This results indirectly in a further cost reduction thanks to increased productivity, since more fiber composites can be processed and separated in the same process time due to the lesser dissolving period than in conventional methods. Furthermore, due to the reduced dissolving time, the treatment time for the steeping and swelling of the fiber composites or the fiber composite materials is also advantageously reduced, so that the rejects separated from the fibers are not needlessly further crushed and do not have to be separated from the actual recycled fibers in subsequent cost-incurring process steps. Furthermore, a damaging of the fibers by the internal friction is reduced due to the shorter treatment time, which leads to a high yield and quality of recycled fibers.

LIST OF REFERENCE NUMERALS

100 Method
101 Method step of filling the container
102 Method step of gas-tight closing of the container
103 Method step of mixing the water and the fiber composite
104 Method step of generating kinetic energy
105 Method substep of lowering the container internal pressure
106 Method substep of equalizing pressure in the container interior
107 Loop sequence of repeating the method step of generating kinetic energy
200 Layout for separation of fibers
210 Main motor
211 Belt pulley
212 Belt pulley
213 Belt
220 Vacuum pump
221 Vacuum line
222 Pressure sensor
240 Sealing water pump
241 Sealing water line
242 Axial face seals of the rotor
243 Axial face seal of the vacuum pump
250 Water intake line
251 Inductive flow meter
252 Water intake valve
300 Cavitation pulper
310 Container
320 Unloading gate
330 Filling cover
331 Closed position
332 Open position
333 Direction of movement
334 Cover frame
340 Ventilation line
341 Valve of ventilation line 342 Connection of valve of the ventilation line
343 Connection of valve of the ventilation line
344A Guide pipe
344B Guide pipe
345 Borehole
346 Internal cylinder chamber
347 Central switching shaft
348 Piston
349 Outer pressure chamber
350 Drive unit
360 Protruding and encircling rubber seal
370 Straight guide
371 Running wheels
372 Brush strip

The invention claimed is:

1. A method for separating fibers using the following elements:
   a container with a predetermined receiving volume;
   a vacuum pump, which is connected via a vacuum line and a valve to the container volume;
   a ventilation line with a predetermined cross sectional opening and at least one valve, wherein the valve is switched in a time range of 19 ms to 41 ms from a closed state to an open state and in a time range of 20 ms to 45 ms from the open state to the closed state;
   and the method involves at least the following steps:
   i) filling the container with a predetermined quantity of water and at least one fiber composite;
   ii) closing the container in a gas-tight manner;
   iii) mixing the water and the fiber composite by stirring;
   iv) after the completion of steps i) to iii) generating kinetic energy in the fiber composite by the steps:
   v) lowering the container internal pressure, relative to a pressure outside the container, to at most −950 hPa; and
   vi) rapidly equalizing the pressure in the container interior with the pressure outside the container in order to generate cavitation in the fiber composite;
   wherein equalizing step (vi) takes place within a time range of 0.001 s and 1 s.

2. The method as claimed in claim 1, wherein the valve is connected via the vacuum line to a check valve.

3. The method as claimed in claim 1, wherein the valve is switched in a time range of 19 ms to 27 ms, from the closed state to the open state and in a time range of 20 ms to 39 ms from the open state to the closed state.

4. The method as claimed in claim 1, wherein step (vi) preferably takes place within a time range of 0.001 s to 0.1 s 0.001 s to 0.01 s.

5. The method as claimed in claim 1, wherein the fiber composite is chosen from a group of fiber systems containing natural fibers, such as plant fibers and/or mineral fibers and/or chemical fibers, formed from natural polymers of plant or animal origin, natural polymers, and/or synthetic polymers and films made of natural polymers and/or synthetic polymers and/or metal and mixtures thereof.

6. The method as claimed in claim 1, wherein besides the water and the fiber composite there is added at least one further additive, which is chosen from a group comprising acids, alkalis, dispersants, wetting agents, and combinations thereof.

7. The method as claimed in claim 1, wherein the fiber composite has been crushed before being placed in the container and the individual pieces of the fiber composite preferably have an edge surface of less than 10000 mm$^2$.

8. The method as claimed in claim 7, wherein the edge length of the individual pieces of the fiber composite increases substantially proportional to the receiving volume of the container.

9. The method as claimed in claim 1, wherein during step (iv) under the action of mechanical energy a differential pressure is maintained at least for an effective time of 2 minutes.

10. The method as claimed in claim 1, wherein step (iv) is repeated for a predetermined number of runs.

11. The method as claimed in claim 10, wherein the first running of step (iv) occurs under the differential pressure with an effective time and under the action of mechanical energy a differential pressure is maintained at least for an effective time of 2 minutes.

12. The method as claimed in claim 10, wherein step (iv) is repeated under variation of the effective time at least in four further runs.

13. The method as claimed in claim 1, wherein step (v) is completed in a time range of 60 s to 120 s.

14. The method as claimed in claim 1, wherein the negative pressure inside the container after step (v) is at most −700 hPa.

15. The method as claimed in claim 1, wherein the material filled into the container from a material suspension, consisting of at least a liquid containing water or water and at least one further additive, and a fiber composite as the solid fraction which in a ratio of liquid to solid fraction, lies in a range between 2% and 35%.

16. The method as claimed in claim 1, wherein after step (vi) the acceleration of the gas flowing into the container after the opening of the valve or valves lies in a range between 2000 m/s$^2$ and 20,000 m/s$^2$.

17. The method as claimed in claim 1, wherein after step (vi) the flow velocity of the gas flowing into the container after the opening of the valve or valves lies in a range between 100 m/s and 750 m/s.

18. The method as claimed in claim 1, wherein the ratio between container volume and the effective cross sectional area of the ventilation line or the valve(s) in the ventilation line according to formula 1 lies in a range between 10,000 and 100,000

$$\text{ratio} = \frac{V_C}{N * \left[\left(\frac{D_V}{2}\right)^2 * \pi * h\right]}. \qquad \text{Formula I}$$

19. The method as claimed in claim 1, wherein step v) further comprises lowering the container internal pressure to between −700 and −950 hPa.

* * * * *